United States Patent [19]

Ricalde

[11] Patent Number: 5,513,506
[45] Date of Patent: May 7, 1996

[54] STEERING WHEEL LOCKING DEVICE

[76] Inventor: Paul Ricalde, 60 Schill Ave., Kenner, La. 70065

[21] Appl. No.: 251,021

[22] Filed: May 31, 1994

[51] Int. Cl.$^6$ .................................................. B60R 25/02
[52] U.S. Cl. ................................ 70/209; 70/237; 70/238
[58] Field of Search ........................... 70/209–212, 225, 70/226, 237, 238, 198–200, 192

[56] References Cited

U.S. PATENT DOCUMENTS

| | | | |
|---|---|---|---|
| 1,463,760 | 7/1923 | Cogner | 70/212 |
| 3,190,090 | 6/1965 | Zaidener | 70/238 |
| 3,898,823 | 8/1975 | Ludeman | 70/209 |
| 4,094,173 | 6/1978 | Brown | 70/237 |
| 4,699,238 | 10/1987 | Tamir | 70/238 |
| 4,779,435 | 10/1988 | Farrow | 70/200 |
| 4,961,331 | 10/1990 | Winner | 70/209 |

FOREIGN PATENT DOCUMENTS 9009911 10/1990 United Kingdom ..................... 70/198

Primary Examiner—Peter M. Cuomo
Assistant Examiner—Monica E. Millner
Attorney, Agent, or Firm—Keaty & Keaty

[57] ABSTRACT

This invention relates to an anti-theft locking device for use with a steering wheel of a vehicle. The device provides for the use of a circular solid shield which fits over and is locked to the rim of the steering wheel by one or two securing clips. An elongated J-shaped locking rod has a hook-shaped lower portion which engages with a control pedal of a vehicle and threadably engages with an upper portion after the upper portion has been fit through a cutout formed in the shield. An enlarged diameter cap of the upper portion of the locking rod prevents the upper portion of the locking rod to pass through the shield.

8 Claims, 1 Drawing Sheet

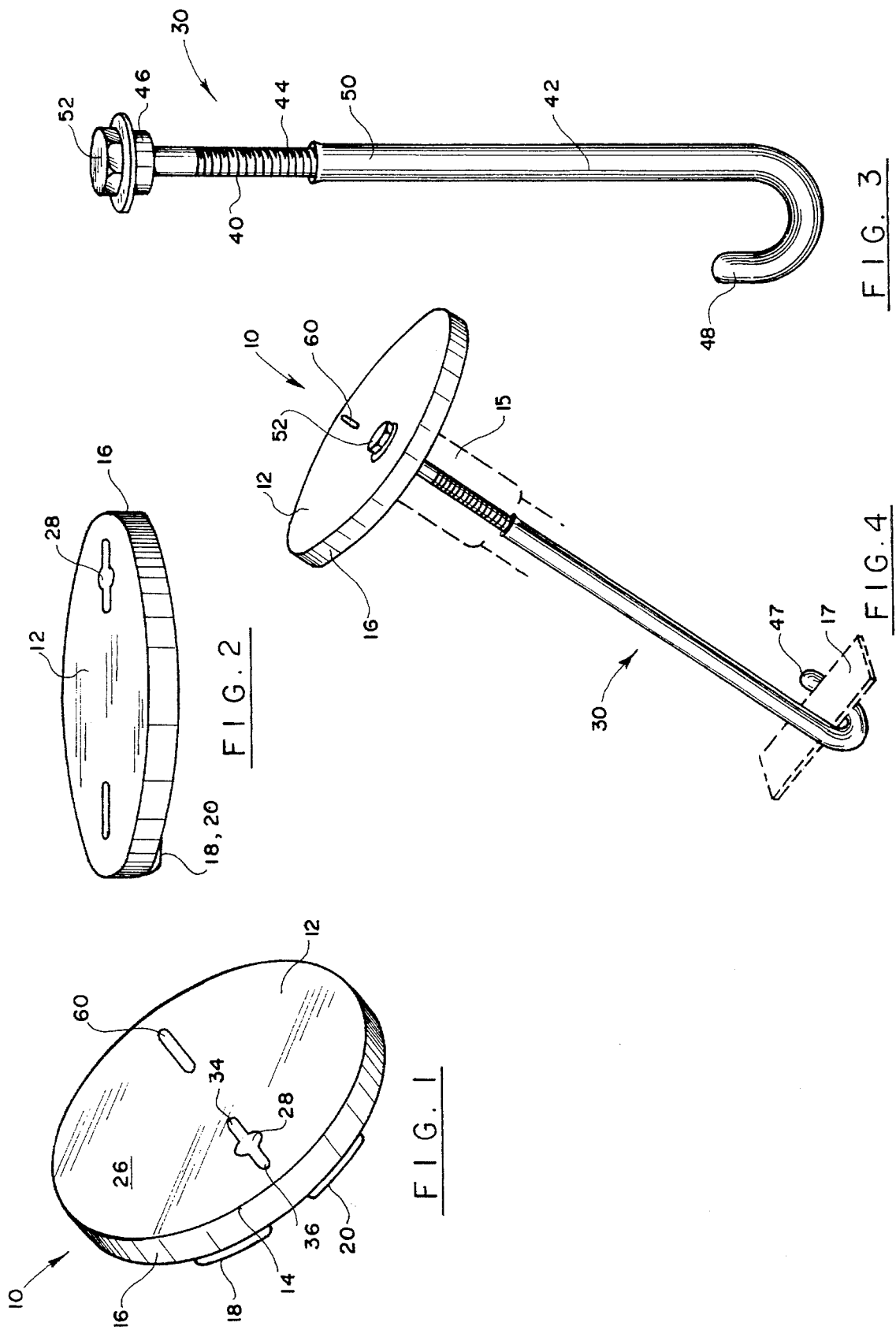

STEERING WHEEL LOCKING DEVICE

BACKGROUND OF THE INVENTION

This invention relates to anti-theft devices adapted for use in vehicles equipped with steering wheels. More particularly, this invention relates to an anti-theft steering wheel locking device for use in conventional type vehicles.

With the car theft on the rise, various devices have been proposed to lock a steering wheel of a car and thereby prevent operation of the car. Some of these devices utilize a club-like rod which is locked to the steering wheel by a transverse pin. However, the steering wheel can be easily cut with a hacksaw cutting through the plastic and then through the small rod that is in the steering wheel. Once the steering wheel is cut, the club can be removed and the car stolen. Other solutions propose the use of an elongated rod which is designed to engage a spoke or rim of the steering wheel and extend to the control pedal of a car, thereby locking the spoke of the wheel with the pedal. Still other devices suggest to use a hook-like member which is configured to cap a hub portion of the wheel. The main draw back of many such devices is the use of a thin rod which can be easily cut to obtain access to the steering wheel. The present invention contemplates elimination of the drawbacks associated with the prior art and provision of an easy-to-install anti-theft device which completely immobilizes the steering wheel. Another problem which the present invention is designed to solve is prevention of theft of air bags which are located in the hub of the steering wheel.

SUMMARY OF THE INVENTION

It is, therefore, an object of the present invention to provide an anti-theft device for locking a steering wheel of a vehicle.

It is another object of the present invention to provide an anti-theft locking device which is easy to install and inexpensive to manufacture.

It is a further object of the present invention to provide an anti-theft steering wheel locking device which will discourage car theft by making it too time consuming and difficult to remove the mounted device.

It is still a further object of the present invention which prevents theft of an air bag secured within a hub of a steering wheel.

These and other objects of the present invention are achieved through a provision of a steering wheel locking device which has a disc-like shield which is sized and shaped to fit in covering relationship over an entire steering wheel of a vehicle, covering the wheel hub. A pair of clips are provided in an upper part of the shield to releasably secure the shield to the rim of the steering wheel of the vehicle. The shield is formed with at least one cutout having a discrete diameter.

The device also provides for the use of a J-shaped locking rod for locking the steering wheel to a control pedal of the vehicle. The locking rod comprises an upper portion and a hook shaped lower portion which threadably engages with the upper portion. The upper portion of the locking rod has a cap provided with an enlarged diameter transverse cap. The upper portion of the locking rod is allowed to pass through the cutout in the shield, while the cap is prevented from passing through the cutout by the transverse plate, the diameter of which is greater than the diameter of the cutout in the shield.

BRIEF DESCRIPTION OF THE DRAWINGS

Reference will now be made to the drawings, wherein like parts are designated by like numerals, and wherein:

FIG. 1 is a perspective view of an anti-theft shield adapted for mounting on a steering wheel of a vehicle.

FIG. 2 is a perspective end view of the shield showing a clip engagement of the shield to the steering wheel.

FIG. 3, is an exploded perspective view of the locking bar which forms a part of the locking assembly in accordance with the present invention.

FIG. 4 is a schematic view illustrating the method of mounting of the shield assembly on a steering wheel.

DETAILED DESCRIPTION OF THE PREFERRED EMBODIMENT

Referring now to the drawings in more detail, numeral 10 designates a steering wheel shield which forms a part of the assembly of the present invention. The shield 10 comprises a disk-shaped body 12 which is sized to fit over a standard steering wheels of a car and which is provided with a number of cutouts, the purpose of which will be explained in more detail hereinafter. The body 12 has an outer circumferential edge 14 and circumferentially downwardly extending lip 16 that extends down over the steering wheel. A pair of tabs, or securing clips 18 and 20 are provided in the upper part of the shield for locking the shield to the spoke of the steering wheel. The clips 18, 20 are securely attached to the lip 16 and have a portion which extends in substantially parallel relationship to a bottom of the shield body 12. A gap between the bottom of the body 12 and the clips 18, 20 is slightly greater than thickness of the steering wheel. When the body 12 is mounted on the wheel 15, it is moved downwardly, so that the clips 18, 20 "catch" the wheel 15.

The shield 12 is formed as a solid body which is wide enough to cover the entire steering wheel including the hub of the wheel. Therefore, access to the air bag which is located in the hub, is prevented. An irregularly shaped cutout 28 is formed in the lower part of the central portion 26, the cutout 28 being adapted to receive a part of the locking rod 30 therethrough. The cutout 28 has a central circular part 32 and a pair of diametrically opposing elongated parts 34 and 36.

Referring now to FIG. 3, the locking rod 30 is seen comprising an upper portion 40 and a J-shaped lower portion 42. The cap 46 has an enlarged diameter transverse plate 52, the diameter of the plate 52 being greater than the size of the cutout 28. The upper portion 40 comprises an elongated rod having external threads 44 covering at least a part of the rod 40 and a cap 46 which is fixedly attached to an uppermost part of the rod 40. The lower portion 42 comprises at least partially hollow tube having internal threads which match the external threads 44 of the upper part 40. The lower portion 42 is adapted to receive the upper portion 40 in a threadably secured relationship. The lowermost hook-shaped part 48 of the portion 42 is adapted to hook over a control pedal of an automobile, for example an accelerator pedal, or a brake pedal.

In order to install the anti-theft device on the steering wheel, the user places the shield 10 over the steering wheel, such that the clips 18 and 20 are oriented upwardly. The clips 18, 20 are then forced into an engagement with the rim of the steering wheel, thereby locking the shield body 12 to the steering wheel itself.

The lower portion 42 of the rod 30 is hooked over a control pedal 17 and is oriented with a top part 50 thereof upwardly, towards the steering wheel. The upper rod portion 40 is passed through the opening 28 downwardly into engagement with the lower portion 42. The upper portion 40 is rotated until a threadable engagement is achieved. Since the diameter of the enlarged diameter transverse plate 52 of the cap 46 is greater than the diameter of the cutout 28, the cap 46 prevents the rod 30 from passing through the shield body 12, thereby further securing position of the shield body 12 on the steering wheel. The parts 34, 36 are slightly greater than the diameter of the straight elongated rod 40 but smaller than the diameter of the cap 46. As a result, the rod 40 can be moved, to a limited degree, within the cutout 28.

If desired, the shield 10 can be also used with conventional club-like locking devices. To allow such use, an elongated rectangular cutout 60 is formed in the bottom part of the shield 10, opposite the cutout 28 to allow passing of the club-like member through the opening. A conventional locking device is not shown in the drawing since it forms no part of the present invention.

It is preferred that the shield 10 and the rod 30 are made from a strong material, for example metal, although other materials of suitable strength are acceptable, as well. It is envisioned that in a conventional application, the shield 10 can be 16 inches in diameter, with the lip 16 being about 1 inch wide. The rod portion 40 can be 16 inches in length, while the rod portion 42 can be about 18 inches in length. These dimensions are exemplary and should not be understood as exclusive or restrictive for the purposes of determining the scope of the present invention.

Many changes and modifications can be made within the design of the present invention without departing from the spirit thereof. I, therefore, pray that my rights to the present invention be limited only by the scope of the appended claims.

I claim:

1. A steering wheel locking device, comprising:

a substantially solid circular shield, fitting in a covering relationship over the steering wheel;

an annular lip fixedly attached to an outer circumferential edge of the shield;

a means carried by said shield for releasably securing the shield to the steering wheel; and a J-shaped locking rod means for locking the steering wheel to a control pedal of a vehicle, said locking rod means being adapted for releasable engagement with the shield positioned on the steering wheel, said locking rod means comprising an upper portion and a J-shaped lower portion threadably engageable with the upper portion, said upper portion of the locking rod means comprising an elongated rod provided with external threads on at least a part thereof, and wherein said upper portion of the locking rod means further comprises a cap fixedly attached to the elongated rod, said cap having an enlarged diameter transverse plate.

2. A steering wheel locking device, comprising:

a substantially solid circular shield, fitting in a covering relationship over the steering wheel;

an annular lip fixedly attached to an outer circumferential edge of the shield;

a means carried by said shield for releasably securing the shield to the steering wheel;

a J-shaped locking rod means for locking the steering wheel to a control pedal of a vehicle, said locking rod means being adapted for releasable engagement with the shield positioned on the steering wheel, said locking rod means comprising an upper portion and a J-shaped lower portion threadably engageable with the upper portion, said upper portion of the locking rod means comprising an elongated rod provided with external threads on at least a part thereof, wherein said upper portion of the locking rod means further comprises a cap fixedly attached to the elongated rod, said cap having an enlarged diameter transverse plate; and wherein said shield is provided with a cutout which allows the elongated rod of the upper portion to pass therethrough, while prevents the transverse plate to pass therethrough.

3. A steering wheel locking device, comprising:

a substantially solid circular shield, fitting in a covering relationship over the steering wheel of a vehicle;

an annular lip fixedly attached to an outer circumferential edge of the shield;

a means carried by said shield for releasably securing the shield to the steering wheel, said securing means comprising a pair of spaced-apart securing clips carried by an upper portion of the shield;

a J-shaped locking rod means for locking the steering wheel to a control pedal of a vehicle, said locking rod means being adapted for releasable engagement with the shield positioned on the steering wheel, said locking rod means comprising an upper portion and a J-shaped lower portion threadably engageable with the upper portion of the locking rod mean, said upper portion of the locking rod means comprising an elongated rod provided with external threads on a least a part thereof, and wherein said lower portion is provided with internal threads in at least a part thereof for matching engagement with external threads of the upper portion of the locking rod means; and wherein said upper portion of the locking rod means further comprises a cap fixedly attached to the elongated rod, said cap having an enlarged diameter transverse plate, and wherein said shield is provided with a cutout to allow the elongated rod of the upper portion to pass therethrough, while preventing the transverse plate to pass therethrough.

4. A method of locking a steering wheel of a vehicle, comprising the following steps:

providing a substantially solid circular shield, fitting over the steering wheel in a substantially covering relationship, said shield having at least one cutout of a discrete diameter;

providing a pair of clips for releasably securing the shield to the steering wheel;

providing a generally J-shaped locking rod, said rod having an upper portion threadably engageable with a hook-shaped lower portion;

positioning the shield over the steering wheel and engaging the clips with the rim of the steering wheel;

engaging the hook-shaped portion with a control pedal of the vehicle;

passing the upper portion of the locking rod through the cutout in the shield; and threadably engaging the upper portion of the locking rod with a hook-shaped lower portion, thereby locking the steering wheel to the control pedal.

5. The method of claim 4, wherein said upper portion is provided with a cap having transverse plate, said plate having a diameter greater than the diameter of the cutout in the shield, said transverse plate preventing the cap of the upper portion to pass through the cutout in the shield.

6. A steering wheel locking device, comprising:

a substantially solid circular shield, fitting in a covering relationship over the steering wheel, said shield being provided with means for allowing fitting of a locking member therethrough wherein the locking member comprises as upper portion comprising a cap fixedly attached thereto;

an annular lip fixedly attached to an outer circumferential edge of the shield;

means carried by said shield for releasably securing the shield to the steering wheel; and wherein said means for allowing fitting of the locking member comprises a cutout formed in the shield a distance from the outer circumferential edge of the shield cap having an enlarged transverse diameter plate, wherein said shield allows the upper portion of the locking member to pass therethrough, while preventing the plate to pass therethrough.

7. A method of locking a steering wheel of a vehicle, comprising the following steps:

providing a circular, substantially solid shield fitting over the steering wheel in a substantially covering relationship;

providing an annular lip unitary attached to an outer circumferential edge of the shield;

providing a pair of clips for releasably securing the shield to the steering wheel;

providing a cutout in the shield a distance from the outer circumferential edge, said cutout allowing fitting of a locking member therethrough;

positioning the shield over the steering wheel and engaging the clips with a rim of the steering wheel; and fitting the locking member through the cutout in the shield.

8. A steering wheel locking device, comprising:

a substantially solid circular shield, fitting in a covering relationship over the steering wheel, said shield being provided with a cutout formed a distance from an outer circumferential edge of the shield for allowing fitting of a locking member therethrough wherein said locking member comprises an upper and lower portion; and an enlarged transverse diameter cap fixedly attached to said upper portion, wherein said cutout of the shield allows the upper portion of the locking member to pass therethrough, while preventing the cap to pass therethrough; and a means carried by said shield for releasably securing the shield to the steering wheel.

* * * * *